United States Patent
Jeong et al.

(10) Patent No.: US 12,155,242 B2
(45) Date of Patent: Nov. 26, 2024

(54) ELECTRONIC DEVICE COMPRISING MULTIPLE BATTERIES

(71) Applicant: Samsung Electronics Co., Ltd., Suwon-si (KR)

(72) Inventors: Kiyeong Jeong, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 17/517,423

(22) Filed: Nov. 2, 2021

(65) Prior Publication Data
US 2022/0060032 A1 Feb. 24, 2022

Related U.S. Application Data

(63) Continuation of application No. PCT/KR2020/005742, filed on Apr. 29, 2020.

(30) Foreign Application Priority Data

May 3, 2019 (KR) .................. 10-2019-0052457

(51) Int. Cl.
*H02J 7/00* (2006.01)
*G06F 1/26* (2006.01)

(52) U.S. Cl.
CPC .............. *H02J 7/0029* (2013.01); *G06F 1/26* (2013.01); *H02J 7/0014* (2013.01)

(58) Field of Classification Search
CPC ...... H02J 7/0029; H02J 7/0014; H02J 7/0025; H02J 7/0068; H02J 7/0013; H02J 7/007; G06F 1/26; G06F 1/263; G06F 1/1635; G06F 1/3212; Y02E 60/10; H01M 10/441

USPC ......................................................... 320/132
See application file for complete search history.

(56) References Cited

U.S. PATENT DOCUMENTS

| 5,204,608 A | 4/1993 | Koenck |
| 6,424,123 B1 | 7/2002 | Odaohhara et al. |
| 6,691,049 B1 * | 2/2004 | Jeansonne ................. G06F 1/28 700/297 |

(Continued)

FOREIGN PATENT DOCUMENTS

| CN | 101814748 A | 8/2010 |
| CN | 103869920 A | 6/2014 |

(Continued)

OTHER PUBLICATIONS

Supplementary European Search Report dated May 25, 2022, in connection with European Application No. 20801466.2, 8 pages.

(Continued)

*Primary Examiner* — M Baye Diao

(57) ABSTRACT

An electronic device may comprise: a first battery having a first capacity; a second battery having a second capacity; a power management module which individually controls a charging state of the first battery and the second battery; a memory; and a processor operably coupled to the power management module, wherein the processor calculates a first cycle relating to the charging state of the first battery and a second cycle relating to the charging state of the second battery, and discharges one of the first battery and the second battery before the other battery on the basis of a reference use voltage determined based on the first cycle or the second cycle.

11 Claims, 11 Drawing Sheets

(56) References Cited

U.S. PATENT DOCUMENTS

| | | | |
|---|---|---|---|
| 7,245,107 B2 | 7/2007 | Moore et al. | |
| 7,693,671 B2* | 4/2010 | Okumura | G01R 31/367 320/132 |
| 7,737,659 B2 | 6/2010 | Morioka | |
| 9,054,551 B2 | 6/2015 | Bak | |
| 9,252,617 B2 | 2/2016 | Yebka et al. | |
| 9,740,264 B2 | 8/2017 | Tsutsui | |
| 9,869,724 B2* | 1/2018 | Kimura | G01R 31/3835 |
| 10,008,873 B2* | 6/2018 | Zeier | H02J 7/02 |
| 10,122,188 B2* | 11/2018 | Eo | H02J 7/0029 |
| 10,270,264 B2 | 4/2019 | Yoon | |
| 10,283,820 B2 | 5/2019 | Sugeno et al. | |
| 10,317,971 B2* | 6/2019 | Shin | G06F 1/1686 |
| 10,790,678 B2 | 9/2020 | Zheng et al. | |
| 11,437,839 B2* | 9/2022 | Ha | H02J 7/0047 |
| 11,489,212 B2* | 11/2022 | Ha | H01M 10/482 |
| 11,855,456 B2* | 12/2023 | Ha | H02J 1/106 |
| 2002/0060554 A1 | 5/2002 | Odaohhara et al. | |
| 2004/0222768 A1 | 11/2004 | Moore et al. | |
| 2007/0029970 A1* | 2/2007 | Barsukov | H01M 10/48 320/130 |
| 2008/0007223 A1 | 1/2008 | Morioka | |
| 2012/0319657 A1 | 12/2012 | Ke et al. | |
| 2013/0141033 A1 | 6/2013 | Bak | |
| 2014/0167699 A1 | 6/2014 | Yebka et al. | |
| 2016/0036258 A1 | 2/2016 | Tsutsui | |
| 2016/0105042 A1* | 4/2016 | Taylor | H01M 10/46 320/134 |
| 2017/0163060 A1 | 6/2017 | Zheng et al. | |
| 2018/0115024 A1 | 4/2018 | Sugeno et al. | |
| 2018/0138722 A1 | 5/2018 | Yoon | |
| 2020/0266499 A1* | 8/2020 | Ha | H01M 10/482 |
| 2020/0266627 A1* | 8/2020 | Ha | H02J 7/0016 |
| 2021/0006078 A1 | 1/2021 | Zheng et al. | |

FOREIGN PATENT DOCUMENTS

| | | |
|---|---|---|
| CN | 107251363 A | 10/2017 |
| JP | 2002095174 A | 3/2002 |
| JP | 2008-005644 A | 1/2008 |
| KR | 10-2008-0000390 A | 1/2008 |
| KR | 10-1319257 B1 | 10/2013 |
| KR | 10-1673533 B1 | 11/2016 |
| KR | 10-2017-0058072 A | 5/2017 |
| KR | 10-2018-0049545 A | 5/2018 |
| KR | 10-1863092 B1 | 7/2018 |
| WO | 2017002292 A1 | 1/2017 |

OTHER PUBLICATIONS

Request for the Submission of an Opinion dated May 3, 2019, in connection with Korean Application No. 10-2019-0052457, 10 pages.

The First Office Action dated Jul. 13, 2023, in connection with Chinese Patent Application No. 202080033378.5, 25 pages.

International Search Report and Written Opinion of the International Searching Authority dated Aug. 25, 2020 in connection with International Application No. PCT/KR2020/005742, 10 pages.

Notification of Granting of Patent Right to Invention dated May 15, 2024, in connection with Chinese Application No. 202080033378.5, 8 pages.

Notice of Final Rejection dated Apr. 17, 2024, in connection with Korean Application No. 10-2019-0052457, 7 pages.

Notice of Final Rejection dated Aug. 8, 2024, in connection with Korean Application No. 10-2019-0052457, 7 pages.

* cited by examiner

ELECTRONIC DEVICE COMPRISING MULTIPLE BATTERIES

CROSS-REFERENCE TO RELATED APPLICATIONS

This application is a Bypass Continuation of International Application No. PCT/KR2020/005742, filed Apr. 29, 2020, which claims priority to Korean Patent Application No. 10-2019-0052457, filed May 3, 2019, the disclosures of which are herein incorporated by reference in their entirety.

BACKGROUND

1. Field

Various embodiments disclosed in the disclosure relate to an electronic device including a plurality of batteries.

2. Description of Related Art

An electronic device, such as a smartphone or a tablet PC, may perform various functions. The electronic device may display an image or text on its display. Recently, an electronic device in a foldable form, including a foldable display, has come to the market.

The electronic device may include a battery. The battery may have energy and power density relatively higher than another energy storage device. The battery may be repeatedly charged and discharged by receiving power through a wired or wireless connection by an external power source between use of the battery. Recently, an electronic device including a plurality of batteries has come to the market. The electronic device including the plurality of batteries may efficiently use its internal mounting space and may add battery capacity to increase its operation time.

As the number of times the battery is charged or discharged increases, the life and/or capacity of the battery may gradually decrease due to degradation of the battery. As the battery is degraded, a safety program such as a swelling phenomenon where a part of the battery swells may occur. To prevent the degradation of the battery, there is a need to accurately calculate and use the life or capacity of the battery.

SUMMARY

When an electronic device according to an existing technology uses a multi-battery, the electronic device electrically connects and uses the multi-battery as one power source. An internal system of the electronic device may handle the multi-battery in the same manner as a form including one battery. In this case, because it is unable to reflect a characteristic of a separate battery, the efficiency of using the multi-battery may decrease.

In general, as a charge and discharge cycle of the battery increases, a full charge voltage may be set to be gradually low. When the multi-battery is handled as one battery, because it is collectively counted as one cycle without reflecting a characteristic of each battery, a problem in which the life of one battery is first decreases occurs.

In accordance with an aspect of the disclosure, an electronic device is provided. The electronic device may include a first battery having a first capacity, a second battery having a second capacity, a power management module configured to separately control a charging state of the first battery and the second battery, a memory; and a processor operably coupled to the power management module. The processor may calculate a first cycle about the charging state of the first battery and a second cycle about the charging state of the second battery and may discharge one battery between the first battery and the second battery earlier than another battery based on a reference operating voltage determined based on the first cycle or the second cycle.

The electronic device according to various embodiments disclosed in the disclosure may adjust each operating voltage or each full charge voltage depending on charge and discharge cycles of a plurality of batteries, thus increasing a time used by each battery and preventing the risk of battery explosion due to swelling.

The electronic device according to various embodiments disclosed in the disclosure may adjust energy from a removable battery to be first consumed, when some of the plurality of batteries are removable, thus increasing the life of an embedded battery.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, the same or similar denotations may be used for the same or similar components.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure are described with reference to the accompanying drawings. Accordingly, those of ordinary skill in the art will recognize that modification, equivalent, and/or alternative on the various embodiments described herein can be variously made without departing from the scope of the present disclosure. With regard to description of drawings, similar denotations may be used for similar components.

Figure 1:
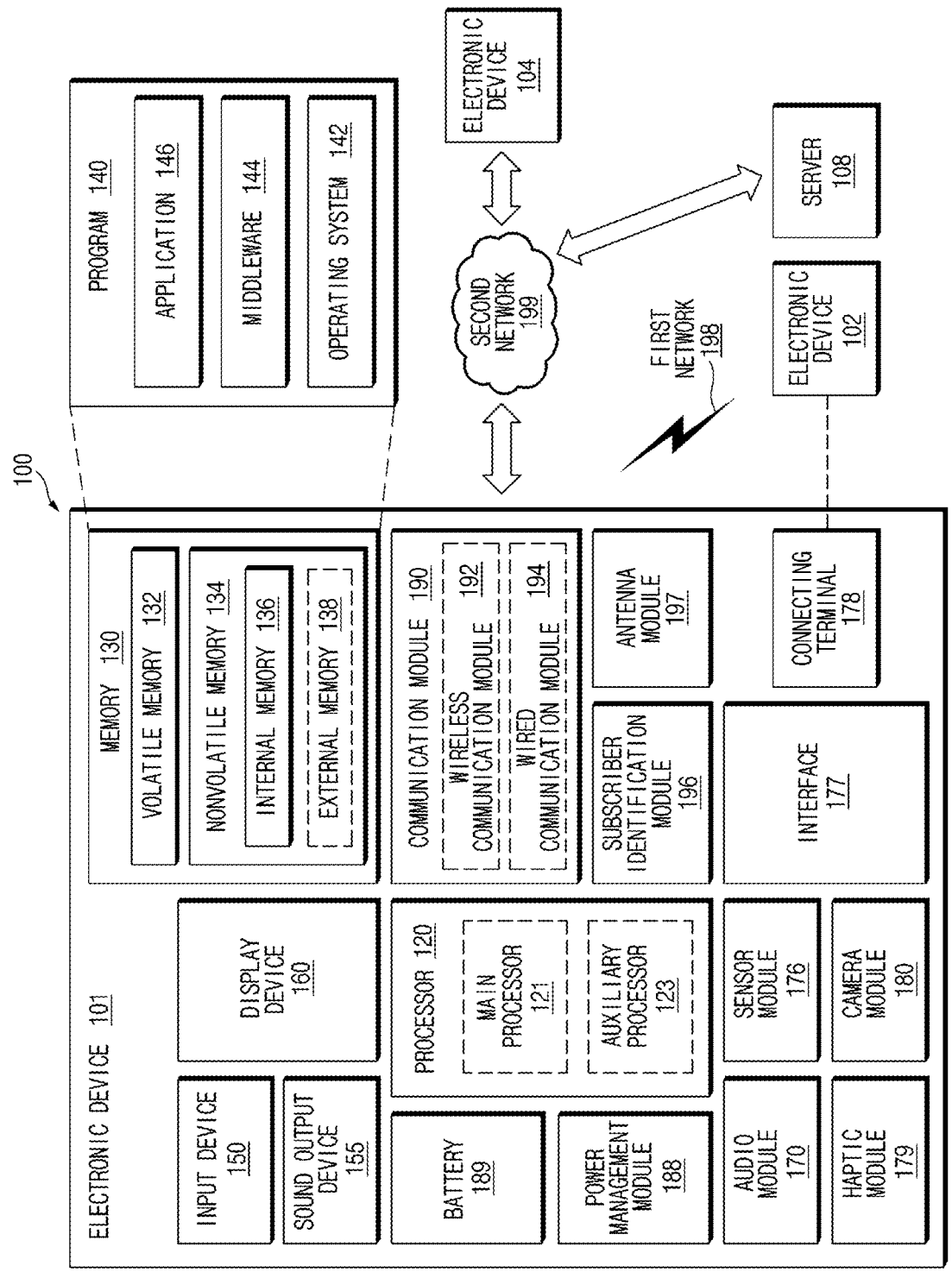
FIG. 1 is a block diagram illustrating an electronic device in a network environment according to various embodiments.

FIG. 1 illustrates a block diagram of an electronic device 101 in a network environment 100, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

The electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
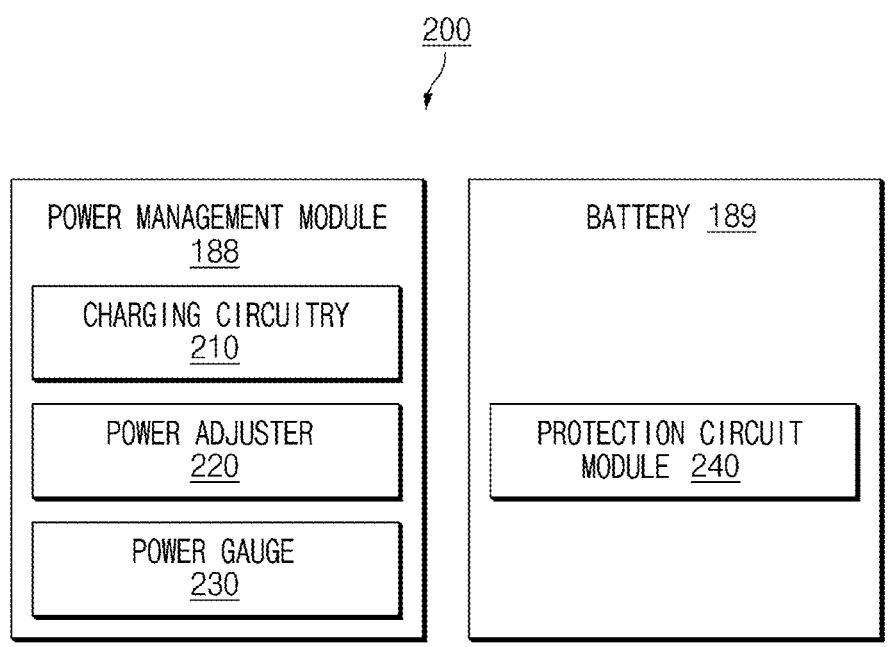
FIG. 2 is a block diagram of a power management module and a battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
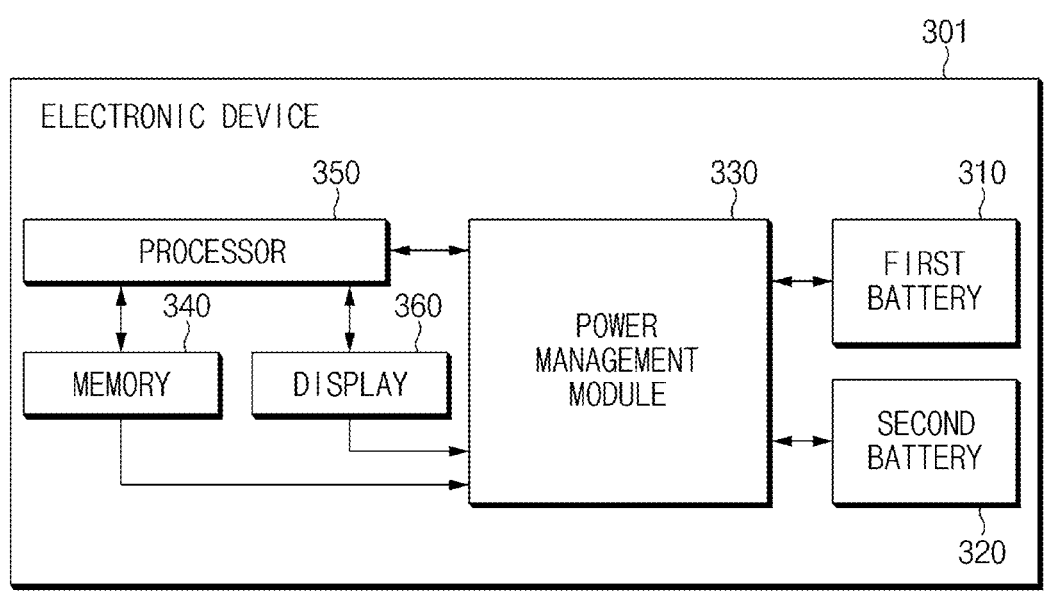
FIG. 3 illustrates an electronic device including a plurality of batteries according to various embodiments.

FIG. 3 illustrates an electronic device including a plurality of batteries according to various embodiments. In FIG. 3, it is illustratively shown that an electronic device 301 includes a first battery 310 and a second battery 320, but not limited thereto. For example, the electronic device 301 may include 3 or more batteries. The electronic device 301 may correspond to an electronic device 101 of FIG. 1. The first battery 310 and the second battery 320 may correspond to a battery 189 of FIG. 1 or 2.

Referring to FIG. 3, the electronic device 301 may include the first battery 310, the second battery 320, a power management module 330, a memory 340, a processor 350, and a display 360.

The first battery 310 and the second battery 320 may supply power to at least one component of the electronic device 301. The first battery 310 and the second battery 320 may be each charged by power wirelessly or wiredly supplied through an external power source. The first battery 310 and the second battery 320 may discharge the charged power by control of the power management module 330.

In an embodiment, the first battery 310 and the second battery 320 may be formed independently of each other and may be separately connected to the power management module 330. In another embodiment, the first battery 310 and the second battery 320 may be configured as different cells to be combined into a package. In this case, the first battery 310 and the second battery 320 may be separately connected to the power management module 330.

In an embodiment, the first battery 310 and the second battery 320 may have different battery capacities. For example, the first battery 310 may have a capacity of 3000 mAh, and the second battery 320 may have a capacity of 1000 mAh. In another embodiment, the first battery 310 and the second battery 320 may have the same battery capacity. For example, each of the first battery 310 and the second battery 320 may have a capacity of 3000 mAh.

In an embodiment, the first battery 310 and the second battery 320 may be an all-in-one battery a user is unable to remove in daily use. In another embodiment, at least one of the first battery 310 and the second battery 320 may be a removable battery the user is able to detach from the electronic device 301 in daily use.

According to various embodiments, the first battery 310 may be connected with the power management module 330 through a plurality of terminals. For example, the plurality of terminals of the first battery 310 may include a (+) terminal and a (−) terminal. The power management module 330 may measure voltage between the plurality of terminals or may measure current flowing in or out through one of the plurality of terminals. The second battery 320 may be connected with the power management module 330 through a plurality of terminals which are implemented independently of the first battery 310. For example, the plurality of terminals of the second battery 320 may include a (+) terminal and a (−) terminal. The power management module 330 may measure voltage between the plurality of terminals or may measure current flowing in or out through one of the plurality of terminals.

The power management module 330 (e.g., a charger IC or a PMIC) may control flow of current output from each of the first battery 310 and the second battery 320 and/or current flowing into each of the first battery 310 and the second battery 320.

The power management module 330 may use power received from each of the first battery 310 and the second battery 320 as a system supply source. The power management module 330 may perform a function of supplying power suitable for a voltage level necessary for each element in the electronic device 301.

The power management module 330 may charge the first battery 310 or the second battery 320 using power supplied from an external power source. For example, the external power source may be a travel adapter (TA), a battery pack, or a wireless pad.

The power management module 330 is shown as a single component in FIG. 3, but is not limited thereto. For example, the power management module 330 may be plural in number (e.g., 2) and may separately manage or control respective batteries.

The memory 340 may store data necessary for an operation of the electronic device 301. In an embodiment, the memory 340 may store a charge and discharge cycle of each of the first battery 310 or the second battery 320. The charge and discharge cycle of each of the first battery 310 or the second battery 320 may be calculated by means of the power management module 330 or the processor 350.

According to various embodiments, the power management module 330 may further include a separate storage element therein. In this case, information about the charge and discharge cycle may be stored in the storage element in the power management module 330.

The processor 350 may perform a variety of calculation necessary for an operation of the electronic device 301. In an embodiment, the processor 350 may control the power management module 330 to be charged or discharged in various manners based on the charge and discharge cycle of the first battery 310 or the second battery 320.

According to various embodiments, the power management module 330 may further include a separate arithmetic element therein. The arithmetic element in the power management module 330 may perform calculation and control associated with a charging state for the first battery 310 or the second battery 320. Hereinafter, the operation of the processor 350 may be performed by means of the separate arithmetic element in the power management module 330.

The display 360 may display content such as text or an image. According to an embodiment, information about a state of the first battery 310 or the second battery 320 may be displayed. For example, the display 360 may integrate the remaining capacity of the first battery 310 and the second battery 320 to be displayed as an icon.

Figure 4:
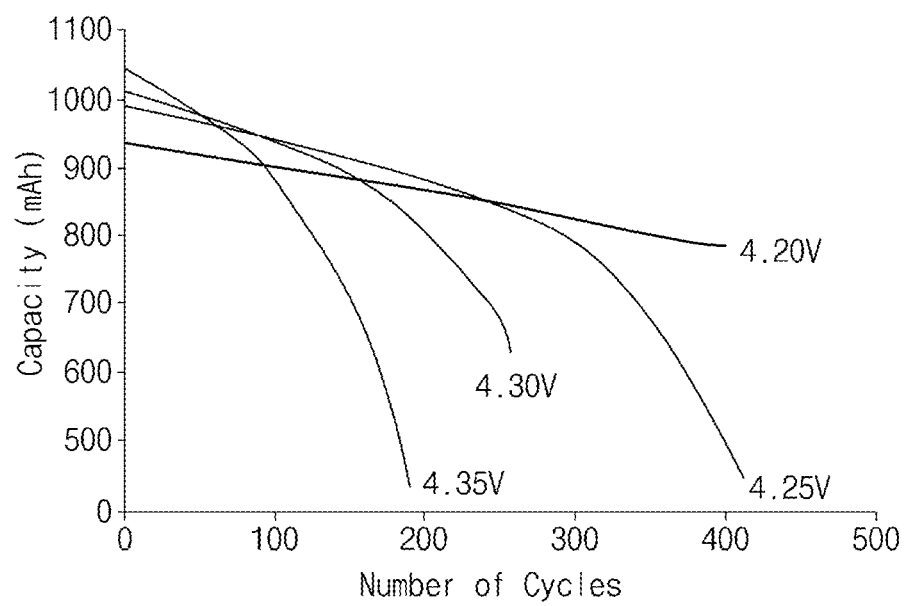
FIG. 4 illustrates a change in capacity according to a charge and discharge cycle of a battery according to various embodiments.

FIG. 4 illustrates a change in capacity according to a charge and discharge cycle of a battery according to various embodiments. FIG. 4 is illustrative, but not limited thereto. A change in capacity according to a charge and discharge cycle may vary in form with various elements such as a manufacturing characteristic, a mounting environment, or a material characteristic of the battery (e.g., a first battery 310 or a second battery 320 of FIG. 3).

Referring to FIG. 4, a power management module 330 may calculate a magnitude of current input to the first battery 310 or the second battery 320 and/or a magnitude of current output from the first battery 310 or the second battery 320.

According to various embodiments, current input to the first battery 310 or the second battery 320 (e.g., current used to charge the first battery 310 or the second battery 320, hereinafter referred to as a charging current) may be represented in various manners using a unit such as A or mA. Alternatively, the charging current may be represented as a C-rate. The C-rate indicates a battery-related characteristic indicating a charge and discharge rate of current according to a battery capacity, and the unit of [C] is generally used. For example, when a capacity of the battery corresponding to the amount of current capable of being used for 1 hour is 1000 mAh and, when a charge and discharge current is 1 A, the C-rate becomes 1 C=1 A/1000 mAh.

According to various embodiments, a processor 350 (or the power management module 330) may calculate a charge and discharge cycle of the first battery 310 or the second battery 320. The charge and discharge cycle may include a charge cycle or a discharge cycle.

The charge cycle may be associated with a ratio between a capacity of the battery and a total current which has been inputted to the battery. The capacity of the battery may be represented in the unit of [Ah] or [mAh] indicating a time when a current of a specified magnitude is able to be output. The charge cycle may be separately calculated for each of the first battery 310 and the second battery 320.

For example, when a capacity of the first battery 310 is 1000 mAh, the first battery 310 may output a current of a magnitude of 1000 mA for 1 hour. When a magnitude of current which has been inputted to the first battery 310 is 1000 mA, the charge cycle may increase by 1000 mA/1000 mAh=1 cycle. When a magnitude of current that has been inputted to the first battery 310 is 700 mA, the charge cycle may increase by 700 mA/1000 mAh=0.7 cycle.

For example, when the charge cycle of the first battery 310 is an Nth cycle, it may mean that current as much as N times the capacity of the first battery 310 has been inputted after the charge cycle is measured.

The discharge cycle may be associated with a ratio between a capacity of the battery and a total current which has been outputted from the battery. The discharge cycle may be separately calculated for each of the first battery 310 and the second battery 320.

For example, when a magnitude of current output from the second battery 320 is 500 mA, a discharge cycle of the second battery 320 having a capacity of 1000 mAh may increase by 500 mA/1000 mAh=0.5 cycle.

According to various embodiments, the battery (e.g., the first battery 310 or the second battery 320 of FIG. 3) may have a specific capacity (or an amount of charge). As the charge and discharge cycle increases, an amount of charge capable of being provided from the battery may gradually decrease. When an operating voltage of the battery (e.g., the first battery 310 or the second battery 320 of FIG. 3) is set to be relatively high, as the charge and discharge cycle increases, capacity capable of being provided from each battery may rapidly decrease.

For example, when the operating voltage of the first battery 310 is set to 4.35 V, the amount of charge capable of being provided by the first battery 310 in a first interval (e.g., 100 charge and discharge cycles or less) may be greater than another operating voltage. After the first interval, the amount of charge capable of being provided by the first battery 310 in a second interval (e.g., greater than 100 charge and discharge cycles and 200 charge and discharge cycles or less) may more rapidly decrease than the previous first interval. In the second interval, when the operating voltage set in the first battery 310 is not changed to be continuously maintained at 4.35 V, the life of the first battery 310 may rapidly decrease.

For another example, when the operating voltage of the first battery 310 is set to 4.30 V, the amount of charge capable of being provided by the first battery 310 in a third interval (e.g., greater than 200 charge and discharge cycles and 300 charge and discharge cycles or less), after the first interval and the second interval, may more rapidly decrease than previous intervals.

For another example, when the operating voltage of the first battery 310 is set to 4.25 V, the amount of charge capable of being provided by the first battery 310 in a fourth interval (e.g., greater than 300 charge and discharge cycles and 400 charge and discharge cycles or less), after the first to third intervals, may more rapidly decrease than previous intervals.

For another example, when the operating voltage of the first battery 310 is set to 4.20 V, the amount of charge capable of being provided by the first battery 310 in a fifth interval (e.g., greater than 400 charge and discharge cycles and 500 charge and discharge cycles or less), after the first to fourth intervals, may gently decrease and the life of the battery may become relatively long.

According to various embodiments, the processor 350 may calculate each of a charge and discharge cycle of the first battery 310 (hereinafter, referred to as a first cycle) and a charge and discharge cycle of the second battery 320 (hereinafter, referred to as a second cycle). The processor 350 may change a charge/discharge scheme of the first battery 310 or the second battery 320 depending on various algorithms based on the first cycle or the second cycle, thus increasing the life of the battery.

According to various embodiments, the processor 350 may set a reference operating voltage of the first battery 310 or the second battery 320 for each interval of the charge and discharge cycle. The processor 350 may determine whether to operate in a mode (hereinafter, referred to as a general mode) of using both the first battery 310 and the second battery 320 or whether to operate in a mode (hereinafter, referred to as a selection mode) of first using a battery of the first battery 310 or the second battery 320, based on a reference operating voltage set to each interval.

According to an embodiment, the reference operating voltage may be set to be gradually low as the first cycle or the second cycle increases. For example, the processor 350 may set the reference operating voltage to 4.35 V in the first interval (e.g., 100 charge and discharge cycles or less) and may change the reference operating voltage to 4.3 V in the second interval (e.g., greater than 100 charge and discharge cycles and 200 charge and discharge cycles or less). The processor 350 may change the reference operating voltage to 4.25 V in the third interval (e.g., greater than 200 charge and discharge cycles and 300 charge and discharge cycles or less) and may change the reference operating voltage to 4.2 V in the fourth interval (e.g., greater than 300 charge and discharge cycles and 400 charge and discharge cycles or less).

Hereinafter, a description will be given of the case where the reference operating voltages of the first battery 310 and the second battery 320 are set to be same as each other in each interval of the charge and discharge cycle, but not limited thereto. For example, in each interval of the charge and discharge cycle, the reference operating voltages of the first battery 310 and the second battery 320 may be set to be different from each other.

According to various embodiments, the processor 350 may set a reference full charge voltage of the first battery 310 or the second battery 320 for each interval of the charge and discharge cycle. When the first battery 310 or the second battery 320 is charged, the processor 350 may input current to the first battery 310 and the second battery 320, until voltage between a positive terminal and a negative terminal is the same as the specified reference full charge voltage. When the reference full charge voltage of the battery (e.g., the first battery 310 or the second battery 320 of FIG. 3) is set to be higher than an actual full charge voltage of the battery, as power is continuously supplied after the battery arrives at the actual full charge voltage upon charging, overcharging may occur. Due to this, the life of the battery may rapidly decrease.

According to various embodiments, the reference full charge voltage of the first battery 310 may be set to be the same as the reference operating voltage of the first battery 310 for each interval of the charge and discharge cycle. Furthermore, the reference full charge voltage of the second battery 320 may be set to be the same as the reference operating voltage of the second battery 320 for each interval of the charge and discharge cycle.

Figure 5:
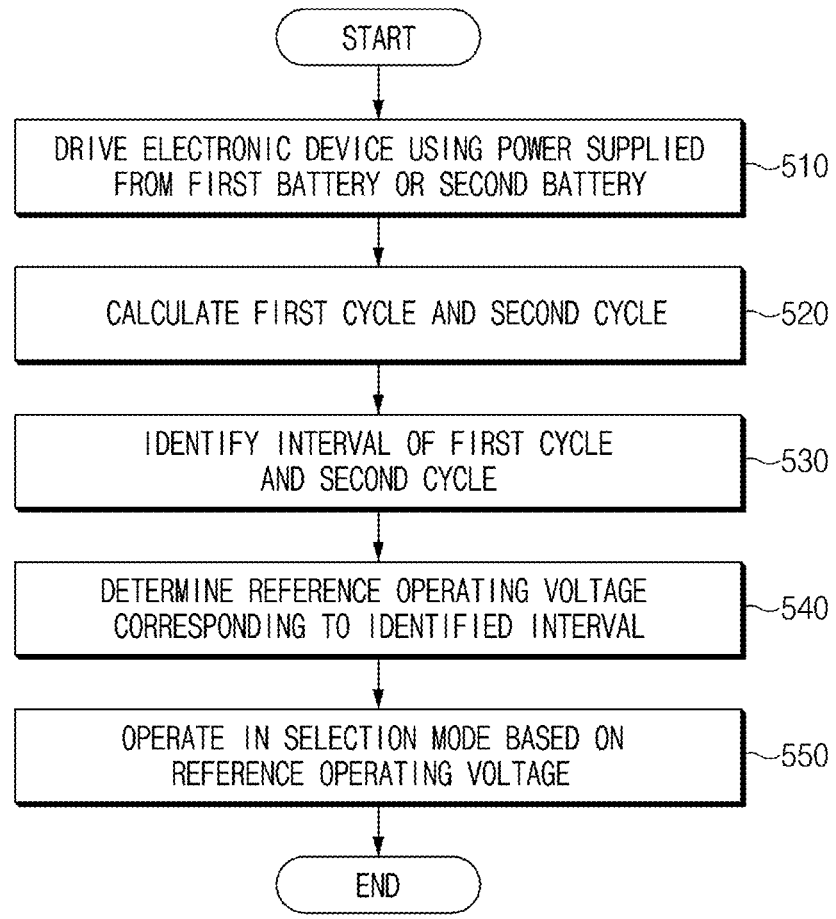
FIG. 5 is a flowchart illustrating a discharging process in a multi-battery according to various embodiments.

FIG. 5 is a flowchart illustrating a discharging process in a multi-battery according to various embodiments.

Referring to FIG. 5, in operation 510, a processor 350 may drive an electronic device 301, using power supplied from a first battery 310 or a second battery 320. The first battery 310 and the second battery 320 may be charged by receiving power through an external power source (e.g., a TA, a battery pack, or a wireless charging pad). The processor 350 may perform various functions, such as web search, video playback, or music playback, using power charged in the first battery 310 and the second battery 320.

In operation 520, the processor 350 may calculate each of a first cycle of the first battery 310 and a second cycle of the second battery 320. As the first battery 310 and the second battery 320 are implemented independently of each other, each charge and discharge cycle may be calculated. The first cycle and the second cycle may be different values.

According to an embodiment, when the amount of charge corresponding to the capacity of the battery is fully consumed irrespective of the number of times of being connected to the external power source, the first cycle and the second cycle may increase by 1. For example, when the first battery 310 having a capacity of 1000 mAh is 100% used (1000 mAh), the first cycle may increase by +1. For another example, when the first battery 310 having a capacity of 1000 mAh is 50% used (500 mAh), is 50% (500 mAh) charged, and is then 50% (500 mAh) used again, the first cycle may increase by +1.

In operation 530, the processor 350 may identify an interval of the first cycle and the second cycle. For example, the processor 350 may divide the charge and discharge cycle into a first interval (e.g., 100 charge and discharge cycles or less), a second interval (e.g., greater than 100 charge and discharge cycles and 200 charge and discharge cycles or less), a third interval (e.g., greater than 200 charge and discharge cycles and 300 charge and discharge cycles or less), a fourth interval (e.g., greater than 300 charge and discharge cycles and 400 charge and discharge cycles or less), and a fifth interval (e.g., greater than 400 charge and discharge cycles). The processor 350 may identify an interval to which each of the first cycle and the second cycle belongs.

In operation 540, the processor 350 may determine a reference operating voltage corresponding to an interval to which the first cycle and the second cycle belong. For example, in the first interval (e.g., 100 charge and discharge cycles or less), the reference operating voltage may be set to 4.25 V. In an interval greater than or equal to the second interval (e.g., 100 charge and discharge cycles or more), the reference operating voltage may be set to 4.20 V.

According to various embodiments, when the first cycle and the second cycle are included in different intervals, the processor 350 may set different reference operating voltages for the first battery 310 and the second battery 320. For example, when the first cycle is the first interval (e.g., 100 charge and discharge cycles or less), the reference operating voltage of the first battery 310 may be set to 4.25 V. When the second cycle is the second interval (e.g., greater than 100 charge and discharge cycles and 200 charge and discharge cycles or less), the reference operating voltage of the first battery 310 may be set to 4.20 V.

In operation 550, the processor 350 may operate in a selection mode based on the determined reference operating voltage. The selection mode may be a mode of first selecting a battery of the first battery 310 or the second battery 320 and supplying power to a configuration in the electronic device 301.

In the selection mode, the processor 350 may select a battery of the first battery 310 or the second battery 320 as a battery to supply power. For example, the processor 350 may compare the first cycle with the second cycle and may first select a battery with a large cycle. For another example, the processor 350 may first select a battery with small capacity between the first battery 310 or the second battery 320. For another example, when there is a removable battery between the first battery 310 or the second battery 320, the processor 350 may first select the removable battery.

According to various embodiments, in the selection mode, the processor 350 may allow the selected battery to be used when the selected battery is less than or equal to the reference operating voltage. For example, when the first battery 310 is used, the processor 350 may control a power management module 330 to first supply power until the operating voltage of the first battery 310 is less than or equal to the reference operating voltage. When the operating voltage of the first battery 310 is less than or equal to the reference operating voltage, the processor 350 may control the power management module 330 to stop discharging the first battery 310 and discharge the second battery 320. When the operating voltage of the second battery 320 is less than or equal to the reference operating voltage, the power management module 330 may operate in a general mode. The general mode may be a mode of performing various operations of the electronic device 301, using power supplied to both the first battery 310 and the second battery 320.

Figure 6:
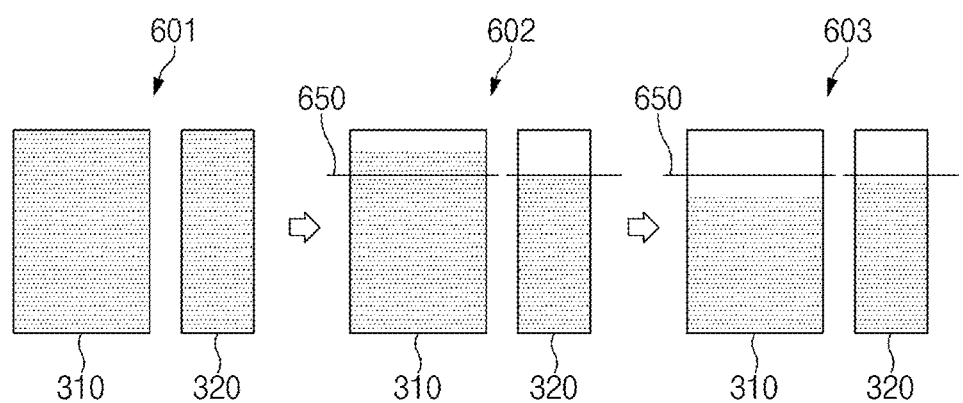
FIG. 6 is a drawing illustrating discharging of a multi-battery according to various embodiments.

FIG. 6 is a drawing illustrating discharging of a multi-battery according to various embodiments.

Referring to FIG. 6, in a first state 601, a first battery 310 and a second battery 320 may be in a state (or a full charge state) higher than a specified reference operating voltage. In the first state 601, the first battery 310 and the second battery 320 may operate in a general mode. The general mode may be a mode of driving each configuration of the electronic device 301, using power supplied from both the first battery 310 and the second battery 320.

According to an embodiment, in the general mode, the first battery 310 or the second battery 320 may supply power in proportion to a battery capacity. For example, when the first battery 310 is 3000 mAh and when the second battery 320 is 1000 mAh, the first battery 310 may discharge 300 mAh and the second battery 320 may discharge 100 mAh to deliver 400 mAh to each configuration of the electronic device 301.

According to another embodiment, in the general mode, the first battery 310 and the second battery 320 may supply power in the same manner irrespective of capacity. For example, when the first battery 310 is 3000 mAh and when the second battery 320 is 1000 mAh, the first battery 310 may discharge 200 mAh and the second battery 320 may discharge 200 mAh to deliver 400 mAh to each configuration of the electronic device 301.

In a second state 602, at least one of the first battery 310 and the second battery 320 may decrease in operating voltage to a reference operating voltage or less. In the second state 602, the first battery 310 and the second battery 320 may operate in a selection mode. The reference operating voltage or less may be determined according to an interval to which a first cycle or a second cycle belongs.

For example, when the reference operating voltage 4.25 V, when the first battery 310 is 3000 mAh, and when the second battery 320 is 1000 mAh, the operating voltage of the first battery 310 may be about 4.32 V and the operating voltage of the second battery 320 may be 4.25 V, when the first battery 310 discharges 100 mAh and the second battery 320 discharges 100 mAh. In this case, the discharging of the second battery 320 may be stopped, and the first battery 310 may be discharged independently.

In a third state 603, both the first battery 310 and the second battery 320 may decrease to the reference operating voltage or less. In the third state 603, the first battery 310 and the second battery 320 may operate in the general mode again.

Figure 7:
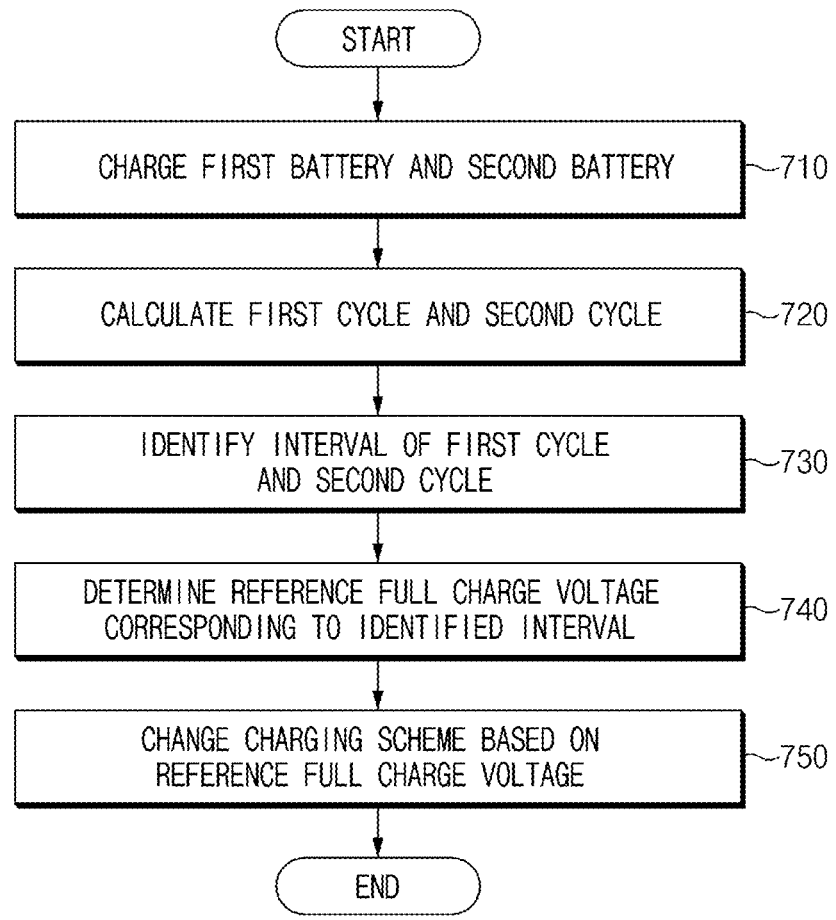
FIG. 7 is a flowchart illustrating a charging scheme of a multi-battery according to various embodiments.

FIG. 7 is a flowchart illustrating a charging scheme of a multi-battery according to various embodiments.

Referring to FIG. 7, in operation 710, a processor 350 (or a power management module 330) may charge a first battery 310 and a second battery 320 using power supplied from an external power source. For example, the external power source may be a TA, a battery pack, or a wireless charging pad.

In operation 720, the processor 350 may calculate each of a first cycle of the first battery 310 and a second cycle of the second battery 320. As the first battery 310 and the second battery 320 are implemented independently of each other, each charge and discharge cycle may be calculated. The first cycle and the second cycle may be different values.

In operation 730, the processor 350 may identify an interval of the first cycle and the second cycle. For example, the processor 350 may divide the charge and discharge cycle into a first cycle (e.g., 100 charge and discharge cycles or less), a second interval (e.g., greater than 100 charge and discharge cycles and 200 charge and discharge cycles or less), a third interval (e.g., greater than 200 charge and discharge cycles and 300 charge and discharge cycles or less), a fourth interval (e.g., greater than 300 charge and discharge cycles and 400 charge and discharge cycles or less), and a fifth interval (e.g., greater than 400 charge and discharge cycles). The processor 350 may identify an interval to which each of the first cycle and the second cycle belongs.

In operation 740, the processor 350 may determine a reference full charge voltage corresponding to an interval to which the first cycle and the second cycle belong. For example, in the first interval, the reference full charge voltage may be set to 4.35 V. In an interval greater than or equal to the second interval, the reference full charge voltage may be set to 4.30V. In the third interval, the reference operating voltage may be set to 4.25 V.

In operation 750, the processor 350 may control the power management module 330 to charge the first battery 310 and the second battery 320 based on the determined reference full charge voltage.

For example, when both the first cycle and the second cycle belong to the first interval, the first battery 310 and the second battery 320 may be charged according to performance of the separate battery without a separate setting of the reference full charge voltage.

For another example, when the first cycle belongs to the first interval and when the second cycle belongs to the second interval, the reference full charge voltage of the first battery 310 may be set to 4.35 V and the reference full charge voltage of the second battery 320 may be set to 4.30 V.

Figure 8:
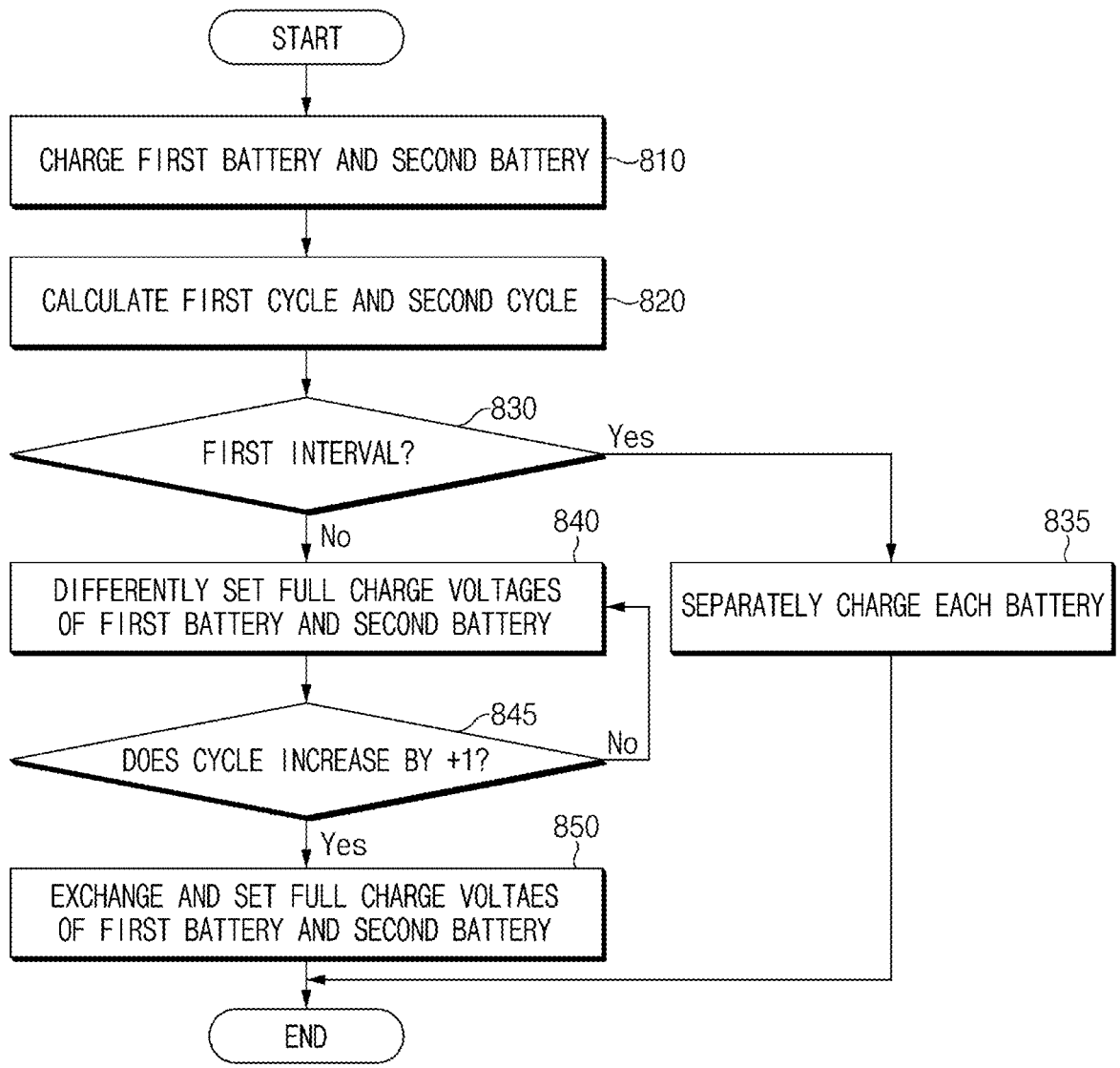
FIG. 8 is a flowchart illustrating a charging scheme of a multi-battery according to a change in reference full charge voltage according to various embodiments.
Figure 9:
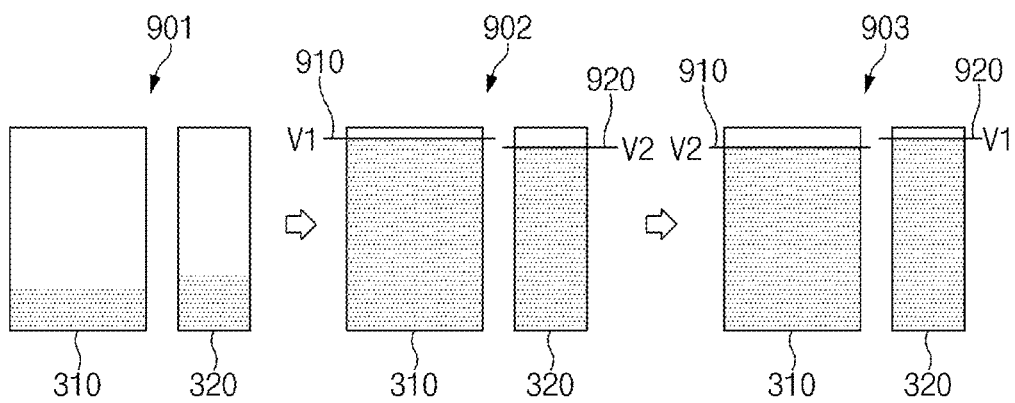
FIG. 9 is a drawing illustrating charging of a multi-battery according to various embodiments.

For another example, when both the first cycle and the second cycle belong to the second interval, the reference full charge voltages of the first battery 310 and the second battery 320 may be set differently for each cycle (refer to FIGS. 8 and 9).

FIG. 8 is a flowchart illustrating a charging scheme of a multi-battery according to a change in reference full charge voltage according to various embodiments.

Referring to FIG. 8, in operation 810, a processor 350 (or a power management module 330) may charge a first battery 310 and a second battery 320 using power supplied from an external power source. For example, the external power source may be a TA, a battery pack, or a wireless charging pad.

In operation 820, the processor 350 may calculate each of a first cycle of the first battery 310 and a second cycle of the second battery 320. As the first battery 310 and the second battery 320 are implemented independently of each other, each charge and discharge cycle may be calculated. The first cycle and the second cycle may be different values.

In operation 830, the processor 350 may identify whether at least one of the first cycle or the second cycle is a first interval. For example, the first interval may be an interval of 100 charge and discharge cycles or less.

When at least one of the first cycle or the second cycle is the first interval, in operation 835, the first battery 310 and the second battery 320 may be charged according to performance of the separate battery without a separate setting of a full charge voltage.

When both the first cycle and the second cycle are not the first interval, in operation 840, the processor 350 may control the power management module 330 such that full charge voltages of the first battery 310 and the second battery 320 are differently set. According to an embodiment, the processor 350 may set the full charge voltage (hereinafter, referred to as a first full charge voltage) of the first battery 310 to a first voltage value and may set a full charge voltage (hereinafter, referred to as a second full charge voltage) of the second battery 320 to a second voltage value. The first voltage value and the second voltage value may be different values. For example, the first full charge voltage may be set to 4.35 V, and the second full charge voltage may be set to 4.30 V.

In operation 845, the processor 350 may identify whether at least one of the first cycle or the second cycle increases.

When the at least one of the first cycle or the second cycle increases, in operation 850, the processor 350 may control the power management module 330 such that full charge voltages of the first battery 310 and the second battery 320 are exchanged with each other and set. The first full charge voltage may be set to the second voltage value, and the second full charge voltage may be set to the first voltage value. For example, the first full charge voltage may be set to 4.30 V, and the second full charge voltage may be set to 4.35 V.

FIG. 9 is a drawing illustrating charging of a multi-battery according to various embodiments. FIG. 9 is illustrative, but not limited thereto.

Referring to FIG. 9, in a first state 901, a first battery 310 and a second battery 320 may be charged using power supplied from an external power source. For example, the external power source may be a TA, a battery pack, or a wireless charging pad.

In the first state 901, a first cycle of the first battery 310 or a second cycle of the second battery 320 may be included in a first interval. In the first interval, each of the first battery 310 and the second battery 320 may be separately charged without a separate setting of a full charge voltage. Alternatively, each of the first battery 310 and the second battery 320 may be charged according to a reference full charge voltage set in the first interval. For example, both the first battery 310 and the second battery 320 may be charged until the full charge voltage is 4.35 V.

In a second state 902, the first cycle and the second cycle may increase to be included in a second interval. The first full charge voltage 910 may be set to a first voltage value V1, and the second full charge voltage 920 may be set to a second voltage value V2. The first voltage value V1 and the second voltage value V2 may be different values. For example, the processor 350 may set the first full charge voltage to 4.35 V and may set the second full charge voltage to 4.30 V.

In a third state 903, when at least one of the first cycle and the second cycle increases by +1, the processor 350 may set the first full charge voltage 910 to the second voltage value V2 and may set the second full charge voltage 920 to the first voltage value V1. For example, the processor 350 may set the first full charge voltage to 4.30 V and may set the second full charge voltage to 4.35 V.

Figure 10:
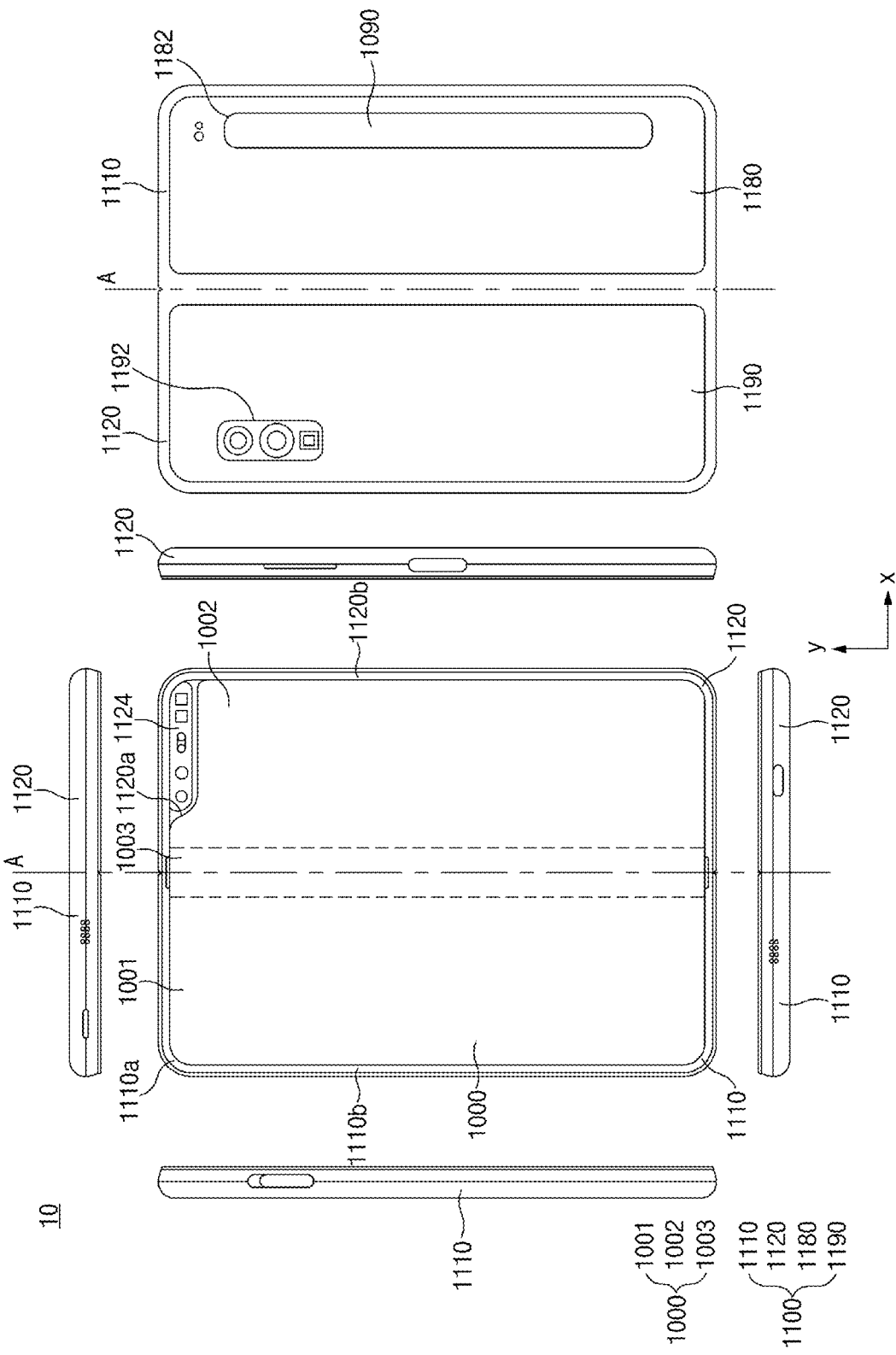
FIG. 10 is a drawing illustrating a flat state of an electronic device according to an embodiment.
Figure 11:
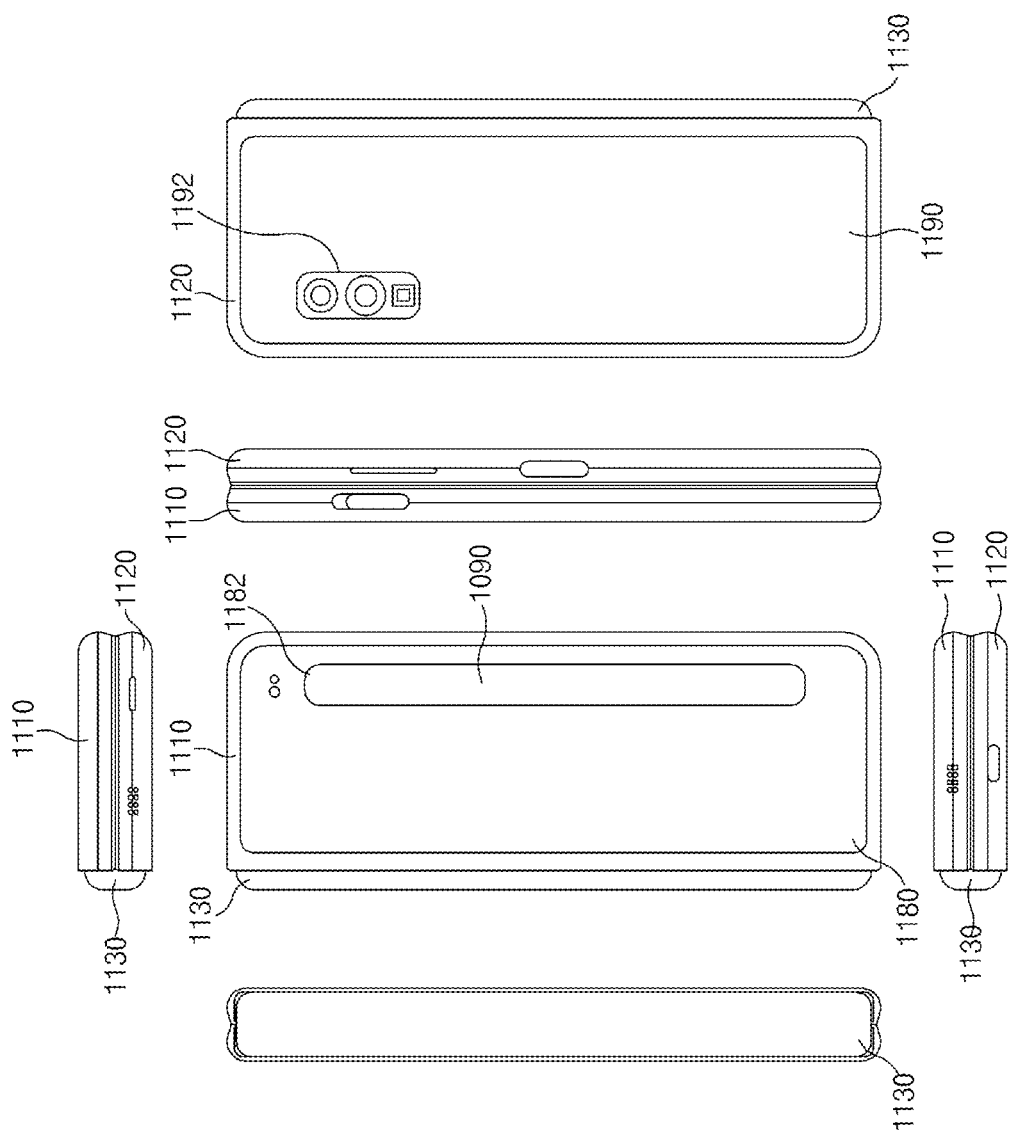
FIG. 11 is a drawing illustrating a folded state of an electronic device according to an embodiment.

Referring to FIGS. 10 to 11, in an embodiment, an electronic device 10 (e.g., an electronic device 101 of FIG. 1) may include a foldable housing 1100, a hinge cover 1130 covering a foldable portion of the foldable housing, and a flexible or foldable display 1000 (hereinafter, in short, the "display" 1000) disposed in a space formed by the foldable housing 1100. In the disclosure, a surface on which the display 1000 is disposed is defined as a first surface or a front surface of the electronic device 10. A surface opposite to the front surface is defined as a second surface or a back surface of the electronic device 10. Furthermore, a surface surrounding a space between the first surface and the back surface is defined as a third surface or a side surface of the electronic device 10.

In an embodiment, the foldable housing 1100 may include a first housing structure 1110, a second housing structure 1120 including a sensor region 1124, a first back cover 1180, and a second back cover 1190. The foldable housing 1100 of the electronic device 10 may not be limited to the shape and connection illustrated in FIG. 10, and may be implemented in another shape or by a combination and/or connection of other components. For example, in another embodiment, the first housing structure 1110 and the first back cover 1180 may be integrally formed with each other, and the second housing structure 1120 and the second back cover 1190 may be integrally formed with each other.

In the embodiment illustrated, the first housing structure 1110 and the second housing structure 1120 may be disposed on both sides about a folding axis (axis A) and may have the overall symmetrical shape with respect to the folding axis A. As will be described later, an angle formed by the first housing structure 1110 and the second housing structure 1120 or a distance between the first housing structure 1110 and the second housing structure 1120 may vary with whether a state of the electronic device 10 is a flat state, a folded state, or an intermediate state. In the embodiment illustrated, unlike the first housing structure 1110, the second housing structure 1120 may additionally include a sensor region 1124 in which various sensors are arranged, but may have a mutually symmetrical shape in the remaining region.

In an embodiment, as illustrated in FIG. 10, the first housing structure 1110 and the second housing structure 1120 may form a recess accommodating the display 1000 together. In the embodiment illustrated, due to the sensor region 1124, the recess may have two or more different widths in a direction perpendicular to the folding axis A.

For example, the recess may have (1) a first width w1 between a first portion 1110a of the first housing structure 1110, which is parallel to the folding axis A, and a first portion 1120a of the second housing structure 1120, which is formed at a periphery of the sensor region 1124, and (2) a second width w2 formed by a second portion 1110b of the first housing structure 1110 and a second portion 1120b of the second housing structure 1120, which does not correspond to the sensor region 1124 and is parallel to the folding axis A. In this case, the second width w2 may be formed to be longer than the first width w1. In other words, the first portion 1110a of the first housing structure 1110 and the first portion 1120a of the second housing structure 1120, which are asymmetrical in shape, may form the first width w1 of the recess, and the second portion 1110b of the first housing structure 1110 and the second portion 1120b of the second housing structure 1120, which are symmetrical in shape, may form the second width w2 of the recess. In an embodiment, distances of the first portion 1120a and the second portion 1120b of the second housing structure 1120 from the folding axis A may be different from each other. The width of the recess is not limited to the example illustrated. In various embodiments, the recess may have a plurality of widths due to a shape of the sensor region 1124 or a portion in which the first housing structure 1110 and the second housing structure 1120 are asymmetrical in shape.

In an embodiment, at least a portion of the first housing structure 1110 and the second housing structure 1120 may be formed of a metal material or a nonmetal material having rigidity of a magnitude selected to support the display 1000.

In an embodiment, the sensor region 1124 may be formed adjacent to a corner of the second housing structure 1120 to have a certain region. Herein, the disposition, shape, and size of the sensor region 1124 are not limited to the example illustrated. For example, in another embodiment, the sensor region 1124 may be provided at another corner of the second housing structure 1120 or in any region between an upper corner and a lower corner. In an embodiment, components for performing various functions, which are embedded in the electronic device 10, may be exposed on the front surface of the electronic device 10 through the sensor region 1124 or through one or more openings provided in the sensor region 1124. In various embodiments, the components may include various types of sensors. The sensor may include at least one of, for example, a front camera, a receiver, or a proximity sensor.

The first back cover 1180 may be disposed at a side of the folding axis on the back surface of the electronic device and may have, for example, a substantially rectangular periphery, and the periphery may be surrounded by the first housing structure 1110. Similarly, the second back cover 1190 may be disposed at another side of the folding axis on the back surface of the electronic device, and a periphery thereof may be surrounded by the second housing structure 1120.

In the embodiment illustrated, the first back cover 1180 and the second back cover 1190 may have a substantially symmetrical shape about the folding axis (axis A). Herein, the first back cover 1180 and the second back cover 1190 may not necessarily have the mutually symmetrical shape. In another embodiment, the electronic device 10 may include the first back cover 1180 and the second back cover 1190 of various shapes. In another embodiment, the first back cover 1180 may be integrally formed with the first housing structure 1110, and the second back cover 1190 may be integrally formed with the second housing structure 1120.

In an embodiment, the first back cover 1180, the second back cover 1190, the first housing structure 1110, and the second housing structure 1120 may form a space where various components (e.g., a printed circuit board or a battery) of the electronic device 10 are able to be arranged. In an embodiment, one or more components may be disposed on the back surface of the electronic device 10 and may be visually exposed. For example, at least a portion of a sub display 1090 may be visually exposed through a first back region 1182 of the first back cover 1180. In another embodiment, one or more components or sensors may be visually exposed through a second back region 1192 of the second back cover 1190. In various embodiments, the sensor may include a proximity sensor and/or a rear camera.

Referring to FIG. 11, the hinge cover 1130 may be disposed between the first housing structure 1110 and the second housing structure 1120 to be composed to cover an inner component (e.g., a hinge structure). In an embodiment, depending on a state (a flat state or a folded state) of the electronic device 10, the hinge cover 1130 may be covered by a portion of the first housing structure 1110 and the second housing structure 1120 or may be exposed to the outside.

For example, as illustrated in FIG. 10, when the electronic device 10 is in the flat state, the hinge cover 1130 may be covered by the first housing structure 1110 and the second housing structure 1120 and may not be exposed. For example, as shown in FIG. 11, when the electronic device 10 is in the folded state (e.g., a fully folded state), the hinge cover 1130 may be exposed to the outside between the first housing structure 1110 and the second housing structure 1120. For example, in an intermediate state where the first housing structure 1110 and the second housing structure 1120 are folded with a certain angle, the hinge cover 1130 may be partially exposed to the outside between the first housing structure 1110 and the second housing structure 1120. Herein, in this case, the exposed region may be smaller than that in the fully folded state. In an embodiment, the hinge cover 1130 may include a curved surface.

The display 1000 may be disposed on a space formed by the foldable housing 1100. For example, the display 1000 may be received on a recess formed by the foldable housing 1100 and may make up most of the front surface of the electronic device 10.

Accordingly, the front surface of the electronic device 10 may include the display 1000, a partial region of the first housing structure 1110 adjacent to the display 1000, and a partial region of the second housing structure 1120 adjacent to the display 100. The back surface of the electronic device 10 may include the first back cover 1180, a partial region of the first housing structure 1110 adjacent to the first back cover 1180, the second back cover 1190, and a partial region of the second back cover 1190 adjacent to the second back cover 1190.

The display 1000 may refer to a display, at least a portion of which is able to be deformed to a flat surface or a curved surface. In an embodiment, the display 1000 may include a folding region 1003, a first region 1001 disposed on a side (e.g., a left side of the folding region 1003 illustrated in FIG. 10) with respect to the folding region 1003, and a second region 1002 disposed on the other side (a right side of the folding region 1003 illustrated in FIG. 10).

The region division of the display 1000, which is shown in FIG. 10, is illustrative, and the display 1000 may be divided into a plurality of (e.g., four or more or two) regions depending on a structure or function thereof. For example, in the embodiment illustrated in FIG. 10, the region of the display 1000 may be divided by the folding region 1003 extended in parallel to a y-axis or the folding axis (axis A), but, in another embodiment, the region of the display 1000 may be divided with respect to another folding region (a folding region parallel to an x-axis) or another folding axis (e.g., a folding axis parallel to the x-axis).

The first region 1001 and the second region 1002 may have the overall symmetrical shape with respect to the folding region 1003. However, unlike the first region 1001, the second region 1002 may include a notch which is cut depending on the presence of the sensor region 1124, but may be symmetrical to the first region 1001 in shape in the remaining region. In other words, the first region 1001 and the second region 1002 may include a portion having a symmetrical shape and a portion having an asymmetrical shape.

Hereinafter, a description will be given of an operation of the first housing structure 1110 and the second housing structure 1120 and each region of the display 100, depending on the state (e.g., the flat state and the folded state) of the electronic device 10.

In an embodiment, when the electronic device 10 is in the flat state (e.g., FIG. 10), the first housing structure 1110 and the second housing structure 1120 may form an angle of 180 degrees and may be arranged to face the same direction. A surface of the first region 1001 of the display 1000 and a surface of the second region 1002 of the display 1000 may form an angle of 180 degrees and may face the same direction (e.g., a front direction of the electronic device). The folding region 1003 may form the same plane as the first region 1001 and the second region 1002.

In an embodiment, when the electronic device 10 is in the folded state (e.g., FIG. 11), the first housing structure 1110 and the second housing structure 1120 may be arranged to face each other. The surface of the first region 1001 of the display 1000 and the surface of the second region 1002 of the display 1000 may form a narrow angle (e.g., between from 0 degree to 10 degrees) and may face each other. At least a portion of the folding region 1003 may be formed with a curved surface having a certain curvature.

In an embodiment, when the electronic device 10 is in the intermediate state (e.g., FIG. 11), the first housing structure 1110 and the second housing structure 1120 may be arranged at a certain angle. The surface of the first region 1001 of the display 1000 and the surface of the second region 1002 of the display 1000 may form an angle greater than that in the folded state and smaller than that in the flat state. At least a portion of the folding region 1003 may be formed of a curved surface having a certain curvature. At this time, the curvature may be smaller than that in the folded state.

According to various embodiments, the first housing structure 1110 may include a first battery (e.g., a first battery 310 of FIG. 3). The first housing structure 1110 may include a first power management module which manages the first battery. The second housing structure 1120 may include a second battery (e.g., a second battery 320 of FIG. 3). The second housing structure 1120 may include a second power management module which manages the second battery. The first battery and the second battery may be formed independently of each other and may be connected to the first power management module and the second power management module, respectively. A processor in the electronic device 10 may control the first power management module and the second power management module to be charged or discharged in various manners based on a charge and discharge cycle of the first battery or the second battery.

An electronic device (e.g., an electronic device 101 of FIG. 1, an electronic device 301 of FIG. 3, or an electronic device 10 of FIG. 10) according to various embodiments may include a first battery (e.g., a first battery 310 of FIG. 3) having a first capacity, a second battery (e.g., a second battery 320 of FIG. 3) having a second capacity, a power management module (e.g., a power management module 330 of FIG. 3) for separately controlling the first battery (e.g., the first battery 310 of FIG. 3) and the second battery (e.g., the second battery 320 of FIG. 3), a memory (e.g., a memory 130 of FIG. 1 or a memory 340 of FIG. 3), and a processor (e.g., a processor 120 of FIG. 1 or a processor 350 of FIG. 3) for controlling the power management module (e.g., the power management module 330 of FIG. 3). The processor (e.g., the processor 120 of FIG. 1 or the processor 350 of FIG. 3) may calculate a first cycle about charging or discharging of the first battery (e.g., the first battery 310 of FIG. 3) and a second cycle about charging or discharging of the second battery (e.g., the second battery 320 of FIG. 3) and may discharge one battery between the first battery (e.g., the first battery 310 of FIG. 3) and the second battery (e.g., the second battery 320 of FIG. 3) earlier than the other battery based on a reference operating voltage determined based on the first cycle or the second cycle.

According to various embodiments, the processor (e.g., the processor 120 of FIG. 1 or the processor 350 of FIG. 3) may determine a battery having an operating voltage higher than the reference operating voltage as the one battery.

According to various embodiments, the processor (e.g., the processor 120 of FIG. 1 or the processor 350 of FIG. 3) may discharge both the first battery (e.g., the first battery 310 of FIG. 3) and the second battery (e.g., the second battery 320 of FIG. 3), when an operating voltage of the one battery is equal to or less than the reference operating voltage.

According to various embodiments, the reference operating voltage may decrease as the first cycle and the second cycle increase.

According to various embodiments, the first battery (e.g., the first battery 310 of FIG. 3) and the second battery (e.g., the second battery 320 of FIG. 3) may be separately connected to the power management module (e.g., the power management module 330 of FIG. 3). The power management module (e.g., the power management module 330 of FIG. 3) may include a first power management circuit connected to the first battery (e.g., the first battery 310 of FIG. 3) and the second power management circuit connected to the second battery (e.g., the second battery 320 of FIG. 3).

According to various embodiments, the first capacity and the second capacity are different values.

According to various embodiments, each of the first battery (e.g., the first battery 310 of FIG. 3) and the second battery (e.g., the second battery 320 of FIG. 3) may be discharged according to the ratio of the first capacity to the second capacity, in a full charge state.

According to various embodiments, the processor (e.g., the processor 120 of FIG. 1 or the processor 350 of FIG. 3) may determine a battery corresponding to a larger cycle between the first cycle and the second cycle as the one battery.

According to various embodiments, the processor (e.g., the processor 120 of FIG. 1 or the processor 350 of FIG. 3) may determine a battery corresponding to a smaller capacity between the first capacity and the second capacity as the one battery.

According to various embodiments, the processor (e.g., the processor 120 of FIG. 1 or the processor 350 of FIG. 3) may determine a removable battery as the one battery, when the removable battery is included the first battery (e.g., the first battery 310 of FIG. 3) and the second battery (e.g., the second battery 320 of FIG. 3).

According to various embodiments, the processor (e.g., the processor 120 of FIG. 1 or the processor 350 of FIG. 3) may charge each of the first battery (e.g., the first battery 310 of FIG. 3) and the second battery (e.g., the second battery 320 of FIG. 3) based on a reference full charge voltage set in a first interval when at least one of the first cycle or the second cycle is the first interval, when an external power source is connected to the power management module (e.g., the power management module 330 of FIG. 3). The processor (e.g., the processor 120 of FIG. 1 or the processor 350 of FIG. 3) may set a full charge voltage of the first battery (e.g., the first battery 310 of FIG. 3) to a first voltage value and may set a full charge voltage of the second battery (e.g., the second battery 320 of FIG. 3) to a second voltage value, when at least one of the first cycle or the second cycle is a second interval subsequent to the first interval.

According to various embodiments, the processor (e.g., the processor 120 of FIG. 1 or the processor 350 of FIG. 3) may set the full charge voltage of the first battery (e.g., the first battery 310 of FIG. 3) to the second voltage value and may set the full charge voltage of the second battery (e.g., the second battery 320 of FIG. 3) to the first voltage value, when at least one of the first cycle or the second cycle increases once.

A power control method according to various embodiments may be performed in an electronic device (e.g., an electronic device 101 of FIG. 1, an electronic device 301 of FIG. 3, or an electronic device 10 of FIG. 10) including a first battery (e.g., a first battery 310 of FIG. 3) and a second battery (e.g., a second battery 320 of FIG. 3), which may include calculating a first cycle about charging or discharging of the first battery (e.g., the first battery 310 of FIG. 3) and a second cycle about charging or discharging of the second battery (e.g., the second battery 320 of FIG. 3) and discharging one battery between the first battery (e.g., the first battery 310 of FIG. 3) and the second battery (e.g., the second battery 320 of FIG. 3) earlier than the other battery based on a reference operating voltage determined based on the first cycle or the second cycle.

According to various embodiments, the discharging of the one battery may include determining a battery having an operating voltage higher than the reference operating voltage as the one battery.

The power control method according to various embodiments may further include discharging both the first battery (e.g., the first battery 310 of FIG. 3) and the second battery (e.g., the second battery 320 of FIG. 3), when an operating voltage of the one battery is equal to or less than a reference operating voltage.

According to various embodiments, the discharging of the one battery may include determining a battery corresponding to a larger cycle between the first cycle and the second cycle as the one battery.

According to various embodiments, the discharging of the one battery may include determining a battery corresponding to a smaller capacity between a first capacity of the first battery (e.g., the first battery 310 of FIG. 3) and a second capacity of the second battery (e.g., the second battery 320 of FIG. 3) as the one battery.

The power management method according to various embodiments may further include charging each of the first battery (e.g., the first battery 310 of FIG. 3) and the second battery (e.g., the second battery of FIG. 3) based on a reference full charge voltage set in a first interval when at least one of the first cycle or the second cycle is the first interval, when an external power source is connected to a power management module (e.g., a power management module 330 of FIG. 3).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a first battery having a first capacity;
a second battery having a second capacity;
a power management module configured to separately control a charging state of the first battery and the second battery;
a memory; and
a processor operably coupled to the power management module,
wherein the processor is configured to:
calculate a first cycle about the charging state of the first battery and a second cycle about the charging state of the second battery,
determine a reference operating voltage based on the first cycle and the second cycle, and when an operating voltage of the first battery is higher than the reference operating voltage and an operating voltage of the second battery is equal to or lower than the reference operating voltage, discharge the first battery until the operating voltage of the first battery becomes equal to the reference operating voltage.

2. The electronic device of claim 1, wherein the processor is further configured to discharge both the first battery and the second battery when the operating voltage of the first battery is equal to or lower than the reference operating voltage.

3. The electronic device of claim 1, wherein the first battery and the second battery are separately connected to the power management module.

4. The electronic device of claim 3, wherein the power management module includes a first power management circuit connected to the first battery and a second power management circuit connected to the second battery.

5. The electronic device of claim 1, wherein the first capacity and the second capacity are different values.

6. The electronic device of claim 1, wherein each of the first battery and the second battery is discharged according to a ratio of the first capacity to the second capacity, in a full charge state.

7. The electronic device of claim 1, wherein the processor is further configured to charge each of the first battery and the second battery based on a reference full charge voltage set in a first interval when at least one of the first cycle or the second cycle is the first interval, when an external power source is connected to the power management module.

8. The electronic device of claim 7, wherein, when at least one of the first cycle or the second cycle is a second interval subsequent to the first interval, the processor is further configured to:

set a full charge voltage of the first battery to a first voltage value, and set a full charge voltage of the second battery to a second voltage value.

9. The electronic device of claim 8, wherein, when at least one of the first cycle or the second cycle increases once, the processor is further configured to:

set the full charge voltage of the first battery to the second voltage value, and set the full charge voltage of the second battery to the first voltage value.

10. A power control method performed in an electronic device including a first battery and a second battery, the power control method comprising:

calculating a first cycle about a charging state of the first battery having a first capacity and a second cycle about a charging state of the second battery having a second capacity;

determining a reference operating voltage based on the first cycle and the second cycle; and when an operating voltage of the first battery is higher than the reference operating voltage and an operating voltage of the second battery is equal to or lower than the reference operating voltage, discharging the first battery until the operating voltage of the first battery becomes equal to the reference operating voltage.

11. The power control method of claim 10, further comprising:

discharging both the first battery and the second battery when the operating voltage of the first battery is equal to or lower than the reference operating voltage.

* * * * *